Feb. 27, 1968
J. C. KONTES ET AL
3,370,761
CONSTANT ADDITION FUNNEL
Filed April 18, 1966
2 Sheets-Sheet 1
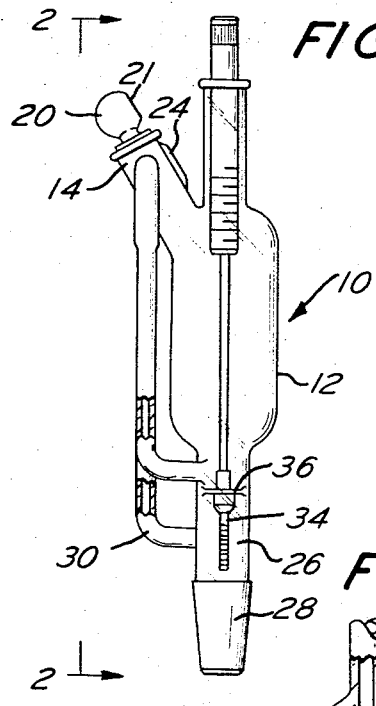
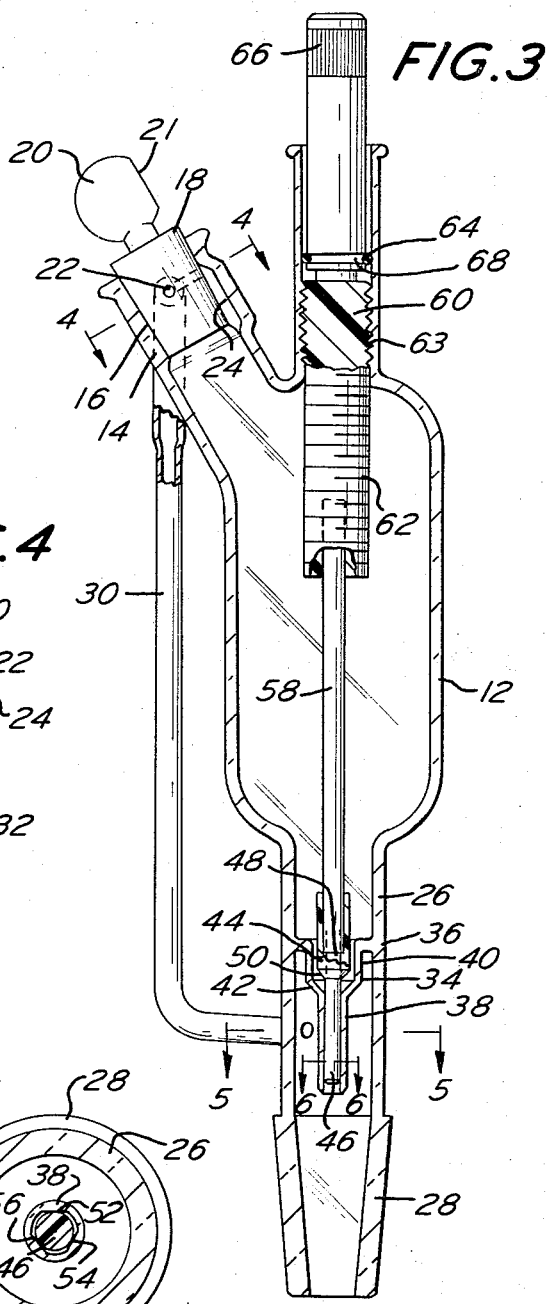
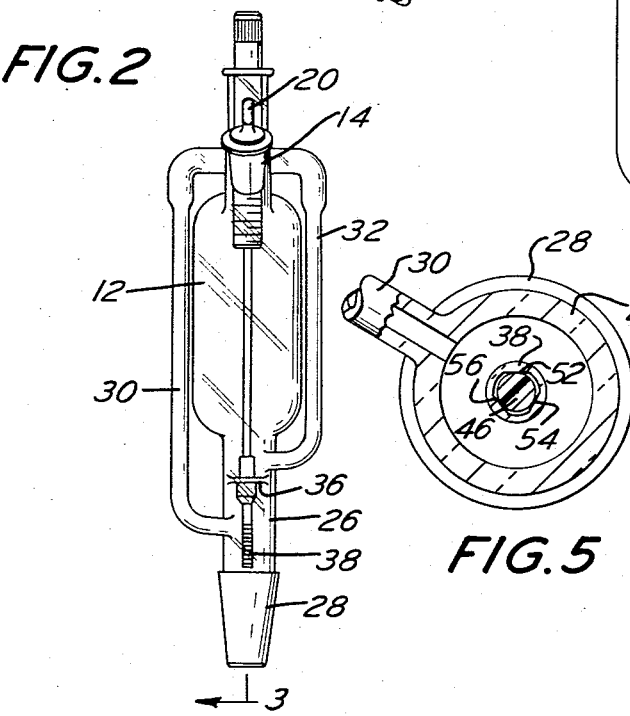
INVENTORS.
JAMES C. KONTES
ROGER GILMONT
BY
Seidel & Gonda
ATTORNEYS.

Feb. 27, 1968  J. C. KONTES ET AL  3,370,761
CONSTANT ADDITION FUNNEL
Filed April 18, 1966  2 Sheets-Sheet 2
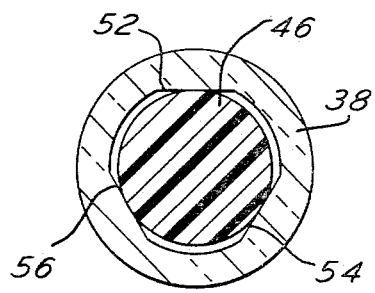
FIG. 6
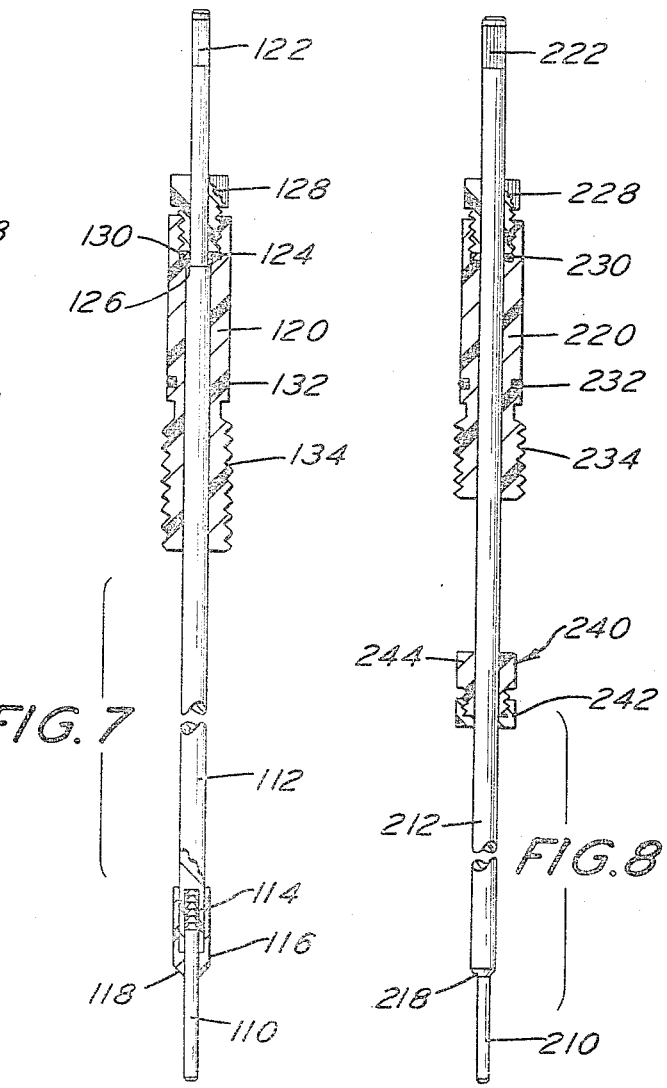
INVENTORS.
JAMES C. KONTES
ROGER GILMONT
BY
Seidel & Gonda
ATTORNEYS.

United States Patent Office 3,370,761
Patented Feb. 27, 1968

3,370,761
CONSTANT ADDITION FUNNEL
James C. Kontes, Vineland, N.J., and Roger Gilmont, Douglaston, N.Y., assignors to Kontes Manufacturing Company, Vineland, N.J., a corporation of New Jersey
Filed Apr. 18, 1966, Ser. No. 543,207
16 Claims. (Cl. 222—422)

ABSTRACT OF THE DISCLOSURE

A constant addition funnel for delivering fluids at a constant drop rate comprising a vessel, a valve adjacent the bottom of the vessel, a conduit extending from a position immediately above the inlet side of the valve through a control stopper to a position adjacent the outlet side of the valve, the control stopper being positionable to selectively place the conduit in communication with the interior of the vessel, said valve including a cooperating delivery tip and valve stem for maintaining concentricity therebetween.

---

This invention relates to a constant addition funnel. More particularly, this invention relates to a funnel capable of maintaing a constant drop rate regardless of the liquid level in the vessel.

In accordance with the present invention, a funnel is provided for use with vacuum systems which is capable of delivering a fluid at a constant rate regardless of the lowering of the level of the liquid contained in the funnel. For many scientific and commercial chemical processes, it is desirable that a funnel be capable of delivering fluids at a constant rate, such rate normally being measured in drops per minute. The drop rate from funnels, however, varies because of two factors. The first factor affecting the drop rate is the height of the liquid contained within the funnel vessel, or stated otherwise, the pressure head at the bottom of the vessel. As the fluid level drops, so does the pressure head with a resultant proportional variation in the drop rate.

The second factor affecting the drop rate is the variation in pressure above the fluid. In a closed vessel, the lowering of the fluid level decreases the gaseous pressure above fluid because the volume of the empty portion of the vessel increases. This follows directly from Boyle's law. The effect on the drop rate is particularly noticeable when the funnel is delivering fluid in a system at reduced pressure. Then small changes in the pressure differential between the system and the vessel cause changes in the drop rate.

The present invention provides a constant addition funnel which overcomes the foregoing disadvantages. The constant addition funnel utilizes a pressure equilization system based upon a novel and unobvious application of the Mariotte principle. The funnel of the present invention is designed to provide a constant pressure head as the fluid level drops and pressure equalization between the funnel vessel and the system receiving the fluid. Moreover, the present invention includes a new unobvious and improved valve means for regulating the drop rate.

It therefore is a general object of the present invention to provide a new unobvious and improved constant addition funnel.

It is another object of the present invention to provide a constant addition funnel in which the drop rate is constant.

It is yet another object of the present invention to provide a constant addition funnel in which the pressure head is constant regardless of the fluid height.

It is yet another object of the present invention to provide a novel valve for controlling the flow of fluid from the funnel over a wide range of dropping rates.

It is still another object of the present invention to provide a novel valve means for controlling the flow of fluid from the funnel into a system under reduced pressure.

It is yet another object of the present invention to provide a novel pressure equalization means for a funnel operating below or above atmospheric pressure.

It is a further object of the present invention to provide a novel valve for controlling the rate of flow of liquid from a funnel having positive shut-off means.

It is yet another object of the present invention to provide a novel valve means for controlling the rate of flow of fluid from the funnel having means whereby the flow rate is reproducible.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is is an elevation of the constant addition funnel in accordance with the present invention.

FIGURE 2 is an elevation of the constant addition funnel shown in FIGURE 1 taken along the line 2—2.

FIGURE 3 is an enlarged sectional view of the funnel shown in FIGURE 2 taken along the line 3—3.

FIGURE 4 is a partial sectional view of the funnel shown in FIGURE 3 taken along the line 4—4.

FIGURE 5 is a transverse sectional view of the delivery end of the funnel shown in FIGURE 3 taken along the line 5—5.

FIGURE 6 is an enlarged partial transverse sectional view of the valve seat illustrated in FIGURE 5.

FIGURE 7 is a sectional view of another embodiment of a valve stem for use with the constant addition funnel.

FIGURE 8 is a sectional view of a third embodiment of a valve stem for use with the constant addition funnel.

Referring now to the drawing in detail, wherein like numerals indicate like elements, there is shown in FIGURE 1 a constant addition funnel in accordance with the present invention designated generally as 10.

The funnel 10 includes a vessel 12 of predetermined size for containing the fluid to be delivered by the funnel 10. In the embodiment shown, the vessel 12 will hold 125 ml. However, it will be readily recognized by those skilled in the art that the size of the vessel 12 is a matter of choice. By way of example, the size of the vessel 12 may be varied to contain 30 ml., 60 ml., 125 ml., 250 ml. or any other desired size.

Fluid is placed into the vessel 12 through a side arm 14 which is mounted adjacent the top of the vessel 12 in communication with the interior thereof. Preferably, the interior of the side arm 14 is ground to a standard taper. The ground portion of the side arm 14 is shown as 16. The side arm 14 is closed by a stopper 18 which preferably has a modified pennyhead 20. An edge of the pennyhead 20 is flattened as at 21 to indicate the rotative position of the stopper 18 for reasons which will become more clear from the description given below. Other types of indicating stoppers can be used. The stopper 18 is ground to standard taper and matingly engages the side arm 14 to close the vessel 12.

As best shown in FIGURES 3 and 4, the stopper 18 contains a T-bore 22. The cross-arm of the T-bore is normal to the leg and extends radially. An elongated channel 24 is provided in the inner wall of the side arm 14. The channel 24 begins at a point below the farthest possible extension of the stopper 18 when it is inserted in the side arm and terminates at a point below the upper end of side arm 14 but above the radial leg of the T-bore 22. With the pennyhead 20 of the stopper 18 positioned as shown in FIGURES 3 and 4, the interior of the vessel 12 is in open communication with the T-bore 22 through the recessed channel 24.

The vessel 12 is open at the bottom and connected to a cylindrical tube 26 having a standard taper ground joint 28 at the distal end thereof. The ground joint 28 may be any standard taper size. Preferably, the joint 28 is a 24/40 standard taper for the 125 ml. size. The same taper is used for the 60 and 250 ml. sizes but a 14/20 standard taper is used for the 30 ml. size. Other joints such as an O ring connector could be used in place of the standard taper joint.

A first conduit 30 is mounted in open communication with the interior of the side arm 14 and in open communication with the tube 26. The conduit 30 is attached to the side arm 14 at a position where it can be aligned with the cross-arm of the T-bore 22 when the stopper 18 is properly positioned in the side arm 14. This is best shown in FIGURE 4.

A second conduit 32 is connected in open communication with the interior of the side arm 14 at a point diametrically opposite to the communication point of the conduit 30. The conduit 32 extends downwardly and is connected in open communication with the tube 26 at a point immediately below the junction of tube 26 and vessel 12. As best shown in FIGURE 4, the cross-arm of the T-bore 22 provides direct communication between the conduits 30 and 32. Preferably the conduit 32 is a capillary tube.

A delivery tip 34 is supported in the tube 26 by means of a ring seal 36 which is integral with the tube 26. The delivery tip 34 defines the outlet for the funnel 10 through which all fluid must flow. The delivery tip 34 is preferably cylindrical with the diameter of the inner wall of the lower portion 38 being smaller than the inner diameter of the upper portion 40. The lower portion 38 is joined to the upper portion 40 by a conical portion 42 which defines a valve seat. Preferably, the ring seal 36 is joined to the end of the upper portion 40 so as to permit complete disposal of the fluid contained in the vessel 12.

The delivery tip 34 cooperates with a valve stem 44 to regulate the flow of fluid from the vessel 12. The valve stem 44 comprises a lower portion 46 which extends into the lower portion 38 of the delivery tip. An upper portion 48 which is larger in diameter than the lower portion 46 but is smaller in diameter than the inner diameter of the delivery tip upper portion 40 is joined to the lower portion 46 by a conical shoulder 50 that is tapered at the same slope as the conical seat 42. When the valve stem 44 is in its lowermost position, the valve stem conical shoulder 50 seats on the delivery tip conical seat 42 to thereby shut off the flow of fluid from the vessel 12. The upper portion 40 and conical seat act as a guide for the valve stem lower portion 46.

The lower portion 46 of the valve stem 44 is cylindrical and equal to or slightly longer than the lower portion 38 of the delivery tip 34. The inner wall of the lower portion 38 of the delivery tip 34 is generally cylindrical but larger in diameter to that of the lower portion 46. Three flats 52, 54 and 56 are provided in the inner wall of the lower portion 38. These flats cooperate with the lower portion 46 of the stem 44 to provide bypass channels through which fluid will flow when the conical shoulder 50 of the valve stem is not seated on the conical portion 42.

Although the valve stem 44 could be made of one piece, in the preferred embodiment it is made in two pieces from a chemically inert plastic material such as "Teflon." As shown, the lower portion 46 extends through the upper portion 48 and is held by a friction fit in a recess formed in the lower end of the connector rod 58. An opening is formed in the top of the upper portion 48 and it in turn is held on the rod 58 by a friction fit. The rod 58 is made of a chemically inert flexible plastic such as "Kel-F."

The support rod 58 is supported by a friction fit in a recess in the bottom of the shaft 60. The shaft 60 is preferably made of a chemically inert self-lubricating plastic material such as "Teflon." Shaft 60 is provided with threads 62 extending from its lowermost end toward a point approximately midway along its length.

An opening at the top of the vessel 12 is defined by an internally threaded tube 64. The shaft 60 extends through the tube 64 and threadedly engages the same. The upper end 66 of the shaft 60 is knurled. The extension of the valve stem 44 into the delivery tip 34 can be adjusted by rotating the shaft 60. An O-ring 68 is mounted in a circumferential recess formed in the shaft 60 and together with the threads 62 and 63 provides a seal whereby the funnel 10 can be used under high vacuum.

As indicated above, adjustment of the shaft 60 controls the extension of the lower portion 46 of the valve stem 44 into the delivery tip lower portion 38. The amount of such extension controls the drop rate of the funnel. Due to the inherent viscosity of the fluid contained within the vessel 12, the farther valve stem lower portion 46 extends into delivery tip lower portion 38, the lower will be the drop rate of the funnel. In accordance with the present invention, the drop rate of the funnel may be reproducibly adjusted from a minimum of one drop per minute to a maximum of 160 drops per minute for water with delivery tip lower portion length of approximately $15/16$ inch.

In previous funnels the valve stem normally included a fine wire extending through an opening or valve tip. The wire is inherently sensitive to damage through rough usage and cannot be used with metal corroding chemicals.

It has been determined that the critical factor in low rate of delivery funnels is not the diameter of the tip but the clearance between the tip and the stem. The flow of fluid is proportional to the cube of clearance distance but only directly proportional to the diameter of the tip. Thus, a small change in clearance can affect a large change in flow rate.

To avoid the disadvantages of a wire valve stem, a large diameter plastic stem has been used. The plastic stem is stronger and not sensitive to corrosive materials. Since a larger diameter tip and stem are used, the clearance between the rod and stem is adjusted accordingly. In the preferred embodiment a clearance of .003 inch is used for a tip and stem approximately $15/16$ inch large.

An essential element of reproducible flow rates is the maintenance of concentricity between the tips 46 and the stem 38. Without concentricity there would be uncontrolled variations in the clearance and major variations in the flow rates. The provision of the three flats 52, 54 and 56 spaced at equal angles and tangent to the tip 46 assures continued maintenance of concentricity.

As shown in FIGURES 1 and 2, graduations are provided on the outer surface of the delivery tip lower portion 38. These scale graduations permit accurate fine resetting of the drop rate from run to run. Thus, the user can note the particular graduation at which the lower end of the valve stem 44 is set and reset the stem at this position after the vessel 12 has been refilled with fluid.

Except for those parts specifically mentioned as being made of chemically inert plastics, the constant addition funnel 10 is preferably made of borosilicate glass throughout. Preferably, the O-ring 68 is of the type sold generally under the trade name "Viton."

The constant addition funnel 10 is utilized as follows to provide a constant drop rate regardless of the volume of fluid in the vessel 12.

The support arm assembly comprising the shaft 60 and rod 58 is rotated to bring the valve stem 44 into the shut-off position. That is, the conical shoulder 50 is seated against the conical seat 42. Next, the stopper 18 is removed from the side arm 14 and the vessel 12 is filled with a fluid. The stopper 18 is replaced so that the T-bore 22 is open to the conduits 30 and 32 as well as the channel 24. This is indicated by having the flat edge of the pennyhead stopper in the topmost position as shown in FIGURE 3.

The funnel 10 is mounted with the ground joint 28 connected to a system that is to receive the fluid. This is accomplished in a manner well-known in the art. Since the funnel 10 is to be used in a system at a reduced pressure, the space above the level of the fluid is permitted to come to pressure equilibrium with the system. This occurs since the vessel 12 is in combination with the system through the channel 24, the T-bore 22, and the conduit 30. Once pressure equilibrium is achieved, the stopper 18 is rotated 180°. This isolates the interior of the vessel 12, but leaves the conduits 30 and 32 in open communication.

The fluid is allowed to flow from the vessel 12 by backing the conical shoulder 50 out of engagement with the seat 42. The rate of flow is controlled by adjusting the amount that valve item lower portion 46 extends into the delivery tip lower portion 38. As the fluid starts to flow, the pressure in the vessel 12 above the fluid is reduced. Consequently, there is a pressure differential between the vessel 12 and the system to which the funnel is connected. Gas is therefore drawn from the system up the conduit 30, through the cross-arm of the T-bore 22 and down the conduit 32. The conduit 32 is always connected above the seal 36 and preferably has an internal diameter that permits it to act as a capillary tube. The system gas bubbles into the vessel 12 from the conduit 32 until pressure is equalized. Thus, there is no pressure differential between the gas in the system and that above the fluid.

Since the conduit 32 is connected above the seal 36 but below the vessel 12, and at the same time is in communication with the system, the effective pressure head effecting the drop rate is then the distance from the opening into conduit 32 to the delivery tip. This distance will not change regardless of the level in the vessel 12. Consequently, the drop rate is always constant for any setting of the valve stem.

From the foregoing, it is apparent that the funnel 10 can produce a constant drop rate regardless of the liquid level in the vessel 12. Moreover, pressure equalization is provided between the system receiving the fluid and the system gas above the vessel 12.

The valve construction wherein the valve shaft is threaded into the vessel structure provides a smooth, easy turning, positive adjustment. The special design of the delivery tip, including the precision shrunk lower portion 38 positively aligns the valve stem for accurate adjustment of the drop rate. The funnel 10 is designed for use with high vacuums and long life. This is accomplished by mounting the O-ring seal above the threads. In this way, it is protected from deterioration by the action of corrosive chemical vapors. The T-bore in the stopper 18 provides for easy start-up evacuation of the system for operation under vacuum. If desired the apparatus can be operated at pressures above atmosphere assuming proper precautions are taken concerning the structure of the glass.

Referring now to FIGURE 7, a second embodiment of the valve rod assembly is shown. In this embodiment means for rapid shut-off of the apparatus is provided.

The valve rod assembly comprises a valve stem lower portion 110 that extends into a recess in the lower end of the valve rod 112. If desired, friction rings 114 may be provided to help retain the lower portion 110 in rod 112. An upper portion of the valve stem 116 is fitted over the rod 112 in a friction fit therewith. The upper portion 116 defines a conical shoulder 118 for cooperation with the valve seat 42.

Rod 112 extends through a threaded shaft 120 and terminates with a knurled end 122. The inner diameter of shaft 120 is equal to the outer diameter of the rod 112 so as to frictionally engage the same. The upper end of rod 112 is of reduced diameter so that the shoulder 124 is formed thereon. Similarly, the inner diameter of shaft 120 is reduced at a point 126 adjacent its upper end. The reduced inner diameter of shaft 120 cooperates with the shoulder 124 to block further extension of the rod 112 into shaft 120.

A knurled lock nut 128 is threaded into the upper end of the shaft 120. By tightening the lock nut 128 against an O-ring 130 positioned around the reduced diameter portion, the rod 112 can be held in any position within the shaft 120.

An O-ring 132 is fitted in a recess on shaft 120 to provide a vacuum seal in cooperation with the tube 64. The threads 134 cooperate with similar threads in tube 60 and permit the position of shaft 120 and hence lower portion 110 to be longitudinally adjusted.

The operation of the valve rod assembly shown in FIGURE 7 is similar to that heretofore described. Thus, the shaft 120 is rotated to adjust the position to the lower portion 110 of the stem in the delivery tip lower portion 38. This of course controls the rate of the fluid flow from the funnel. The rod 58 is frictionally held by the cooperation between shaft 120, locking nut 128 and O-ring 130. If quick shut-off of the funnel is desired, the frictional engagement can be overcome by merely pressing down on rod 112 and thereby driving the shoulder 118 into engagement with the valve seat 42. This is particularly advantageous where fine adjustment of the valve stem lower portion 110 is accomplished by providing a large number of thread per inch on the shaft 120. In this case, the operator may not be able to shut down the flow of fluid from the funnel as rapidly as is necessary in certain chemical reactions.

Referring now to FIGURE 8, a third embodiment of the valve rod assembly is shown. In this embodiment, quick shut-off means are provided as well as means for accurately reproducing the flow rate.

As shown, a valve stem lower portion 210 is frictionally fitted in the rod 212. A shoulder 218 for cooperation with a valve seat 42 is provided on the end of rod 212. Rod 212 extends through shaft 220 and terminates in knurled end 222. In this embodiment, the diameter of rod 212 is constant throughout its length. Rod 212 is frictionally held within shaft 220 by a knurled lock nut 128 threaded into the end of shaft 220. The lock nut forces an O-ring 230 into frictional engagement with the rod 212. An O-ring 232 is fitted in a groove on shaft 220 and cooperates with a tube 64 to provide a vacuum seal. Threads 234 are provided on shaft 220 for cooperation with similar threads in tube 64. For reasons to be explained below, the threads 234 can be much shorter in length than the threads 134 or the threads 63.

Intermediate the shaft 220 and shoulder 218, a collet 240 is provided. The collet 240 comprises a cylindrical collar 242 which threadedly receives a collet head 244. By tightening the head 244 into the collar 242, the collet 240 can be caused to frictionally engage the rod 212 anywhere along its length.

The rod assembly shown in FIGURE 8 is used in the following manner. The collet 240 is positioned adjacent the lower end of rod 212. Thereafter, the rod assembly is inserted into the funnel and the shoulder 218 engaged with the seat 42. A sample of the fluid to be delivered is placed in the funnel and the shoulder 218 is backed away from the seat 42 until the correct flow rate is achieved. Adjustment of the tip 210 is accomplished simply by sliding the rod 212 within the shaft 220. Once the flow rate is established, the lock nut 228 is tightened to hold the position of rod 212 in shaft 220.

Thereafter, the entire rod assembly is removed from the funnel without disturbing the relative position of rod 212 in shaft 220. Next, the collet 240 is loosened and pushed up the rod 212 until head 244 abuts the bottom of shaft 220. The collet 240 is tightened into this position so as to be held in frictional engagement with the rod 212. Then the rod assembly is once again placed into the funnel 10 and the shaft 220 is rotated until lower end of tip 210 is positioned where it had been previously adjusted to arrive at the correct flow rate. This can be accomplished by noting the correct graduation on tip 38.

Once the assembly has been repositioned in the funnel, the rod 212 can be slid through the shaft 220 so as to bring the shoulder 218 into engagement with the valve seat 42. The funnel can then be filled with fluid as heretofore described. Thereafter, the correct flow rate is simply provided by sliding the rod 212 upwardly until the head 224 engages the bottom of shaft 220. The procedure outlined above is ideal for repeated uses of the funnel for delivering the same fluid at the same rate. The funnel can be rapidly shut off at any time by pushing the rod 212 down until the shoulder 218 engages the seat 42.

In the preferred embodiment the rod assemblies shown in FIGURES 7 and 8 are made from chemically inert plastics such as "Teflon," "Kel-F" and the like. The O-rings may be of the type known as Viton O-rings.

The prevent invention may be embodied in other specific forms without departing from the spirit or essential attributes thereof and, accordingly, reference should be made to the appended claims, rather than to the foregoing specification as indicating the scope of the invention.

We claim:

1. A constant addition funnel comprising a hollow vessel, stopper means for closing said vessel, valve means adjacent the bottom of said vessel for controlling the rate of flow of fluid from said vessel, and closed conduit means for providing open communication between points adjacent the inlet and outlet side of said valve, a portion of said conduit means extending at least to the top of said vessel whereby fluid contained by said vessel cannot bypass said valve means.

2. A constant addition funnel in accordance with claim 1 wherein said stopper means is adjacent the top of said vessel, said stopper means including a side arm extending from said vessel, a recess in the inner side wall of said side arm, said recess extending from said vessel partly along said side arm, a stopper adapted to be matingly received in said side arm for closing said vessel, a T-bore in said stopper, said conduit means including a first conduit providing open communication between a point adjacent the inlet side of said valve and said side arm, second conduit means providing open communication between a point adjacent the outlet side of said valve and said side arm, said T-bore being positionable in said stopper to provide communication between said first and second conduits and said recess or between said conduits only.

3. A constant additional funnel in accordance with claim 1 wherein said valve means includes an elongated hollow delivery tip defining an opening in the bottom of said vessel, means mounting an elongated valve stem for reciprocal movement within said delivery tip, the inner wall of said delivery tip and the outer wall of said valve stem being shaped to make only partial contact whereby fluid can flow between said tip and said stem, and a portion of said valve stem being shaped to fully engage said delivery tip for closing said valve.

4. A constant addition funnel in accordance with claim 3 wherein said mounting means includes a threaded support shaft in threaded engagement with a threaded opening in said vessel, said valve stem slidably extending through said shaft, and means to position said stem in said stem in said shaft.

5. A constant addition funnel in accordance with claim 4 wherein adjustable stop means in positioned on said stem.

6. A constant addition funnel in accordance with claim 1 wherein said valve means includes an elongated hollow delivery tip defining an opening in the bottom of said vessel, a threaded opening in the top of said vessel, a supporting arm extending through said opening and threadedly engaged therewith for reciprocation within said vessel, an elongated valve stem mounted on said arm for reciprocal movement within said delivery tip, the inner wall of said delivery tip and the outer wall of said valve stem being shaped to make only partial contact, whereby fluid can flow between said delivery tip and said valve stem, and an upper portion of said valve stem being shaped to fully engage said delivery tip for closing said valve.

7. A constant addition funnel in accordance with claim 1 wherein said valve means includes an elongated hollow delivery tip defining an opening in the bottom of said vessel, a threaded opening in the top of said vessel, a support arm extending through said opening and threadedly engaged therewith for reciprocation within said vessel, an O-ring providing a seal between said opening and said arm, an elongated valve stem mounted on said arm for reciprocal movement within said delivery tip, the inner wall of said delivery tip and the outer wall of said valve stem being shaped to make only partial contact, whereby fluid can flow between said delivery tip and said stem, and an upper portion of said valve stem being shaped to fully engage said delivery tip for closing said valve.

8. A constant addition funnel in accordance with claim 1 wherein said valve means includes an elongated hollow delivery tip defining an opening in the bottom of said vessel, graduations on said delivery tip, means mounting an elongated valve stem for reciprocal movement within said delivery tip, the inner wall of said delivery tip and the outer wall of said valve stem being shaped to make only partial contact whereby fluid can flow between said delivery tip and said valve stem, and an upper portion of said valve stem being shaped to fully engage said delivery tip for closing said valve.

9. A constant addition funnel in accordance with claim 1 wherein said stopper means includes a side arm extending from said funnel, a recess in the inner side wall of said side arm, said recess extending from said vessel partly along said side arm, a stopper adapted to be matingly received in said side arm for closing said funnel, a T-bore in said stopper, said conduit means including a first conduit providing open communication between a point adjacent the inlet side of said valve and said side arm, a second conduit providing open communication between a point adjacent the outlet side of said valve in said side arm, said T-bore being positionable in said stopper to provide communication between first and second conduits and said recess, or between said conduits only, said valve means including an elongated hollow delivery tip defining an opening in the bottom of said vessel, means mounting an elongated valve stem for reciprocal movement within said delivery tip, the inner wall of said delivery tip and the outer wall of said valve stem being shaped to make only partial contact, whereby fluid can flow between said delivery tip and said stem, and an upper portion of said valve being shaped to fully engage said delivery tip for closing said valve.

10. A constant addition funnel in accordance with claim 1 including a tube extending from the bottom of said vessel and having a tapered joint adjacent the distal end thereof, said valve means including an elongated hollow delivery tip mounted within said tube and defining an opening in the bottom of said vessel, one end of said conduit means being connected to said tube adjacent the outlet side of said delivery tip and the other end of said conduit being connected to said tube adjacent the inlet side of said delivery tip.

11. A constant addition funnel in accordance with claim 10 wherein said valve stem is cylindrical, the inner wall of said delivery tip being cylindrical, and portions of the inner wall of said delivery tip being flattened whereby said valve stem makes only partial contact with the inner wall of said delivery tip.

12. A constant addition funnel in accordance with claim 1 wherein said valve means includes a tube depending from the bottom of said vessel and having a tapered joint on the distal end thereof, an elongated hollow delivery tip, said delivery tip being mounted within said tube by means of a seal joining one end thereof to the side wall of said tube, the upper portion of said delivery tip being wider than the lower end and a valve seat joining said upper and lower portions, a threaded opening in the top of said vessel, a support arm extending through said opening in threaded engagement therewith, an elongated valve stem mounted on said support arm for reciprocal movement within said delivery tip, the inner wall of said delivery tip and the outer wall of said valve stem being shaped to make only partial contact, whereby fluid can flow between said delivery tip and said stem, the upper portion of said valve stem being wider than the lower portion thereof, a shoulder joining said valve stem upper portion to said valve stem lower portion for engagement therewith, whereby said shoulder can engage said seat for closing said valve, and one end of said conduit means being in open communication with said tube adjacent the outlet side of said delivery tip and the other end of said conduit means being in open communication with said tube adjacent the inlet side of said delivery tip.

13. A constant addition funnel in accordance with claim 1 wherein said stopper means includes a side arm adjacent the top of said vessel, a longitudinal recess in the inner side of said side arm, said recess extending from said vessel partly along said side arm, a stopper shaped to be matingly received in said side arm, for closing said funnel, a T-bore in said stopper, a tube extending from the bottom of said vessel and having a tapered joint on the distal end thereof, an elongated hollow delivery tip mounted within said tube, means mounting an elongated valve stem for reciprocal movement within said delivery tip, the inner wall of said delivery tip and the outer wall of said valve stem being shaped to make only partial contact, whereby fluid can flow between said delivery tip and said stem, a portion of said valve stem being shaped to fully engage said delivery tip for closing said valve, said conduit means including a first conduit providing open communication between a point adjacent the inlet side of said delivery tip and said side arm a second conduit providing open communication between a point adjacent the outlet side of said delivery tip and said side arm, said T-bore being positionable in said stopper to provide communication between said first and second conduits and said recess or between said conduits only.

14. A constant addition funnel in accordance with claim 1 wherein said stopper means includes means for selectively placing said conduit means in or out of communication with said vessel.

15. A constant addition funnel in accordance with claim 1 wherein means are provided in said conduit means for selectively placing said conduit means in or out of communication with said vessel.

16. A constant addition funnel comprising a hollow vessel for retaining a liquid, a side arm adjacent the top of said vessel and extending therefrom, a longitudinal recess in the inner side wall of said arm, said recess extending from said vessel partly along said side arm, a stopper adapted to be matingly received in said side arm for closing said vessel, a T-bore in said stopper, valve means adjacent the bottom of said vessel for controlling the rate of flow of liquid from said vessel, said valve means including a tube extending from the bottom of said vessel and having a tapered joint on the distal end thereof, an elongated hollow delivery tip, seal means supporting the upper end of said delivery tip within said tube, the upper portion of said delivery tip being wider than the lower portion, a threaded opening in the top of said vessel, a support arm extending through said opening and threadedly engaged therewith for reciprocal movement within said vessel, an elongated valve stem mounted on said arm for reciprocal movement within said delivery tip, the distal end portion of said valve stem and the inner wall of said delivery tip being shaped to make only partial contact whereby fluid can flow between said delivery tip and said stem, the upper portion of said valve stem being wider than the lower portion and shaped to engage said delivery tip for closing said valve, a first conduit providing open communication between a point adjacent the inlet side of said delivery tip and said side arm, a second conduit providing open communication between a point adjacent the outlet side of said delivery tip and said side arm, said T-bore being positionable in said stopper to provide communication between said first and second conduits and said recess or between said conduits only.

References Cited

UNITED STATES PATENTS 2,771,228   11/1956   Dobbie et al. _____ 222—481.5

FOREIGN PATENTS 817,387   7/1959   Great Britain.

ROBERT B. REEVES, *Primary Examiner.*

HADD S. LANE, *Examiner.*